3,786,120
Patented Jan. 15, 1974

3,786,120
CONVERSION OF URANIUM HEXAFLUORIDE TO URANIUM DIOXIDE STRUCTURES OF CONTROLLED DENSITY AND GRAIN SIZE
William Roger De Hollander, San Jose, Calif., and Harold Holmes Klepfer, Wilmington, N.C., assignors to General Electric Company
Filed Oct. 2, 1970, Ser. No. 77,447
Int. Cl. C01g 43/02
U.S. Cl. 264—.5                     20 Claims

ABSTRACT OF THE DISCLOSURE

An integrated process for fabricating uranium dioxide structures of desired shape, density and grain size from enriched uranium hexafluoride is presented. Uranium hexafluoride is reacted with a reducing gas and an oxygen-containing carrier gas in a reduction-hydrolysis reaction in an active flame to yield a uranium dioxide rich powder of high usrface area with fluoride impurities. The powder is separated from the gas stream after the reaction, and if the powder has a high fluoride impurity, the powder is defluorinated by heating under a controlled atmosphere so that the high surface area of the powder is preserved. The powder is then prepressed, granulated, pressed into a structure of desired shape and sintered under a controlled atmosphere to yield a ceramic structure of desired density and grain size. The gas stream from the reaction is treated to condense the hydrogen fluoride and water vapor as aqueous hydrofluoric acid.

BACKGROUND OF THE INVENTION

Uranium oxides have various utilities in the nuclear industry. Uranium dioxide is utilized in the nuclear industry as a fuel for nuclear reactors. The uranium dioxide structures produced in this invention have a preferred utility as a fuel for nuclear reactors. The performance of the fuel elements, traditionally uranium dioxide structures clad in a metal container, is crucial to the practical success of the nuclear reactor. Nuclear power generation has imposed severe requirements on the performance of fuel in nuclear reactors, especially on properties of grain size and density of the fuel. It has been demonstrated that fine grain uranium dioxide structures are more subject to creep than large grain uranium dioxide structures. It has also been discovered that the density of the uranium dioxide is a very important physical property influencing the performance of the fuel. In fabricated forms, uranium dioxide is a ceramic capable of compaction to give a structure of desired density and a low impurity level. The enrichment of uranium customarily takes place through use of the compound uranium hexafluoride so that a process is required for converting uranium hexafluoride into uranium dioxide in a form which can be readily fabricated to structures having a low fluoride content and a desired density and grain size.

Current practice for converting uranium hexafluoride to uranium dioxide employs hydrolysis of uranium hexafluoride to give a solution of uranyl fluoride and hydrogen fluoride from which ammonium diuranate is precipitated by the addition of ammonia. After filtration the ammonium diuranate of high fluoride content is dissolved in nitric acid with fluoride decontamination of the resulting uranyl nitrate solution being accomplished by solvent extraction. From the resulting purified uranyl nitrate solution, ammonium diuranate is reprecipitated and then calcined to give $U_3O_8$ which in turn is reduced with hydrogen to give uranium dioxide.

It is desirable to replace this involved, expensive ammonium diuranate conversion process by a gas phase reaction of uranium hexafluoride with a very successful method being described in copending U.S. patent application Ser. No. 77,446, entitled Process for Producing Uranium Dioxide Rich Compositions from Uranium Hexafluoride, filed of even date with this invention in the names of W. R. De Hollander and A. G. Dada and assigned to the same assignee which application is hereby incorporated by reference.

In summary, the prior art ammonium diuranate practice described above for conversion of uranium hexafluoride to uranium dioxide does not provide a dependable, continuous, low cost process yielding uranium dioxide. For this reason it is desirable to integrate the gas phase reaction for flame conversion of uranium hexafluoride to uranium dioxide described in the above-identified patent application with additional powder processing and sintering steps to enable production of ceramic grade uranium dioxide structures suitable for nuclear applications.

SUMMARY OF THE INVENTION

In the practice of this invention, the uranium hexafluoride is reacted with a reducing gas and an oxygen-containing carrier gas in a reduction-hydrolysis reaction in an active flame to yield a very high surface area powder rich in uranium dioxide. The powder is separated from the gaseous atmosphere resulting from the reaction and, if the powder has a higher fluoride ion content than desired, the powder is defluorinated by heating under a controlled atmosphere so that the high surface area of the powder is preserved. The gaseous atmosphere from the reduction-hydrolysis reaction is treated to condense the hydrogen fluoride and moisture constituents as aqueous hydrofluoric acid. The remaining gaseous constituents are disposed of, such as by burning the constituents in a flame to insure complete oxidation and then releasing them to the atmosphere. The uranium dioxide powder is treated by prepressing and granulating to increase the flow and bulk density properties of the powder and then the powder is pressed to a green shape of desired configuration and sintered under a controlled atmosphere to a ceramic structure of desired density and grain size. The sintering atmosphere is constituted so that it defluorinates and controls the oxygen to metal ratio of the sintered structure if the fluoride and oxide content of the powder are outside specifications.

It is a principal object of this invention to provide a process for making uranium dioxide structures from an enriched uranium hexafluoride precursor with the process enabling dual control of the two critical parameters of density and grain size of the uranium dioxide structures.

Another object of this invention is to provide a method for removing fluoride impurities in a uranium dioxide rich powder produced in an active flame from the reactants of a reducing gas, an oxygen-containing carrier gas and uranium hexafluoride in a reduction-hydrolysis reaction so that the uranium dioxide has a very high purity and surface area enabling compaction to dense structures.

Still another object of this invention is to provide a method of partially condensing the gas stream resulting from the flame conversion of uranium hexafluoride to uranium dioxide to give an aqueous hydrofluoric acid by-product of commercial quality.

Still another object of this invention is to provide a processing sequence for uranium dioxide powder produced by flame conversion of uranium hexafluoride involving the steps of prepressing, granulating and pressing the uranium dioxide powder, with or without a preliminary defluorination step, giving green uranium dioxide structures of desired configuration which are then sintered in a controlled atmosphere to give a solid uranium dioxide of controlled density and grain size.

Other objects and advantages of this invention will be apparent to a person skilled in the art from a reading of the following description of the invention, the appended claims and by reference to the accompanying drawings described immediately hereinafter.

DETAILED DESCRIPTION OF THE INVENTION

Figure 1:
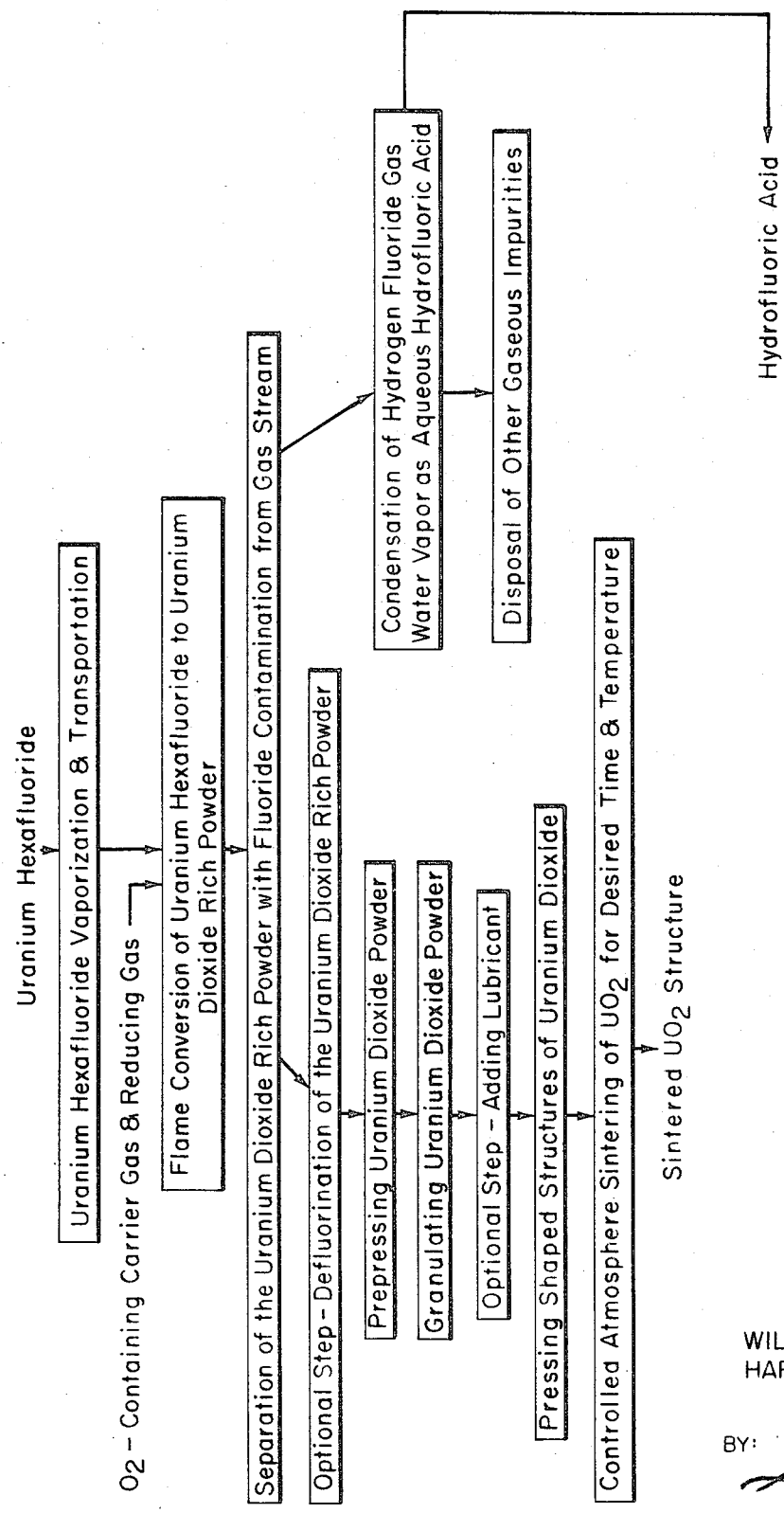
FIG. 1 presents a simplified block diagram illustrating the steps in the process of the present invention which is described hereinafter in detail.

The foregoing objects have been accomplished in a new process for producing uranium dioxide structures of desired configuration, density and grain size from an enriched uranium hexafluoride precursor. The description of this invention will be presented with headings corresponding to major steps presented in the block diagram of FIG. 1.

$UF_6$ Vaporization and Transportation

Uranium hexafluoride is a white waxy solid with a low vapor pressure at room temperature and pressure. Uranium hexafluoride is normally shipped in closed cylinders at room temperature and pressure and it is removed from the cylinder either by melting and pouring out a liquid or by heating to sublime a gas. Since a gas phase is required in the practice of this invention, any solid uranium hexafluoride is heated in the container to sublime the uranium hexafluoride after which it is transported to the reactor for conversion to uranium dioxide.

$UF_6$ Conversion to $UO_2$ Rich Powder

The conversion step of this invention uses any of the process embodiments disclosed in the above-identified copending U.S. patent application Ser. No. 77,446. This process can be summarized as the conversion of gaseous uranium hexafluoride to uranium dioxide in the presence of an autogenous flame in a reactor which separately receives a mixture of uranium hexafluoride and an oxygen-containing carrier gas as a first gaseous reactant, a reducing atmosphere as a second gaseous reactant, and a shield gas used to separate temporarily the gaseous reactants and to prevent temporarily substantial mixing and reaction between the gaseous reactants. After sufficient cross diffusion of the gaseous reactants through the shield gas, a flame reduction-hydrolysis reaction results between the uranium hexafluoride, the carrier gas and the reducing atmosphere. The reaction flame is removed, or lifted away, from the inlet used to introduce the reactants to the reactor.

Figure 2:
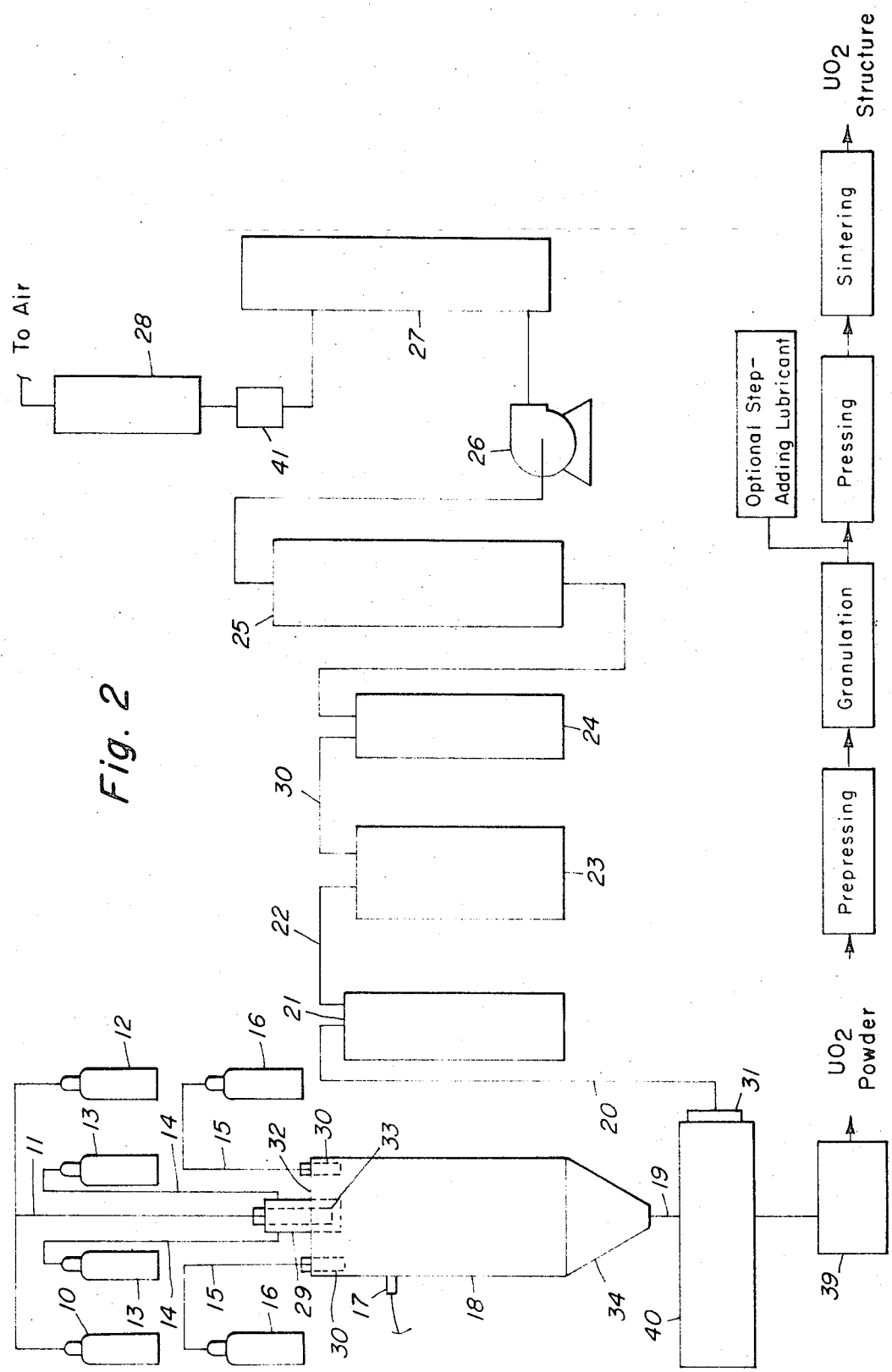
FIG. 2 shows a schematic representation of apparatus for the practice of the steps in the process of the present invention.

Referring now to FIG. 2, uranium hexafluoride gas from cylinder 10 is fed through line 11 along with an oxygen-containing carrier gas from cylinder 12 so that a first reactant comprising a mixture of uranium hexafluoride and the oxygen-containing carrier gas is achieved in line 11 and introduced to reactor 18 through tube 33. A shield gas from cylinders 13 is carried in lines 14 and introduced to the reactor 18 through tube 29 so that the shield gas surrounds the first reactant as the first reactant is introduced to the reactor 18. A second reactant, a reducing gas, is carried in lines 15 and introduced to the reactor 18 through tubes 30 from cylinders 16 here shown in duplicate with one line 15 on each side of the reactor cover 32.

Any of the embodiments presented in the aforementioned copending U.S. patent application Ser. No. 77,446 can be utilized here. In particular in one possible embodiment, the inlet to the reaction zone could be three concentric tubes with the smallest tube being used to introduce the mixture of uranium hexafluoride and oxygen-containing carrier gas, the next larger tube being used to introduce the shield gas and the largest tube being used to introduce the reducing gas. Another embodiment (shown by dotted lines in FIG. 2) has two concentric tubes 33 and 29 as the inlet to the reaction zone near the center of the cover 32 of the reactor 18 with the smaller tube 33 receiving the mixture of uranium hexafluoride and the oxygen-containing carrier gas from line 11, and the larger tube 29 receiving the shield gas from lines 14 while the reducing gas is introduced through two separate tubes 30, each tube being positioned toward the side of the reactor on opposite sides of the centrally positioned inlet of tubes 33 and 29. Still another embodiment has an inlet of a multiplicity of small tubes nested within a single larger tube with the longitudinal axes of the tubes being substantially parallel. Through each small tube a mixture of uranium hexafluoride and the oxygen-containing carrier gas is introduced to the reaction zone. In the space surrounding the small tubes and defined by the larger tube, the shield gas is introduced to the reaction zone. In this embodiment the reducing gas is introduced through two separate tubes, each tube being positioned outside the larger tube on opposite sides of the cover. The small tube(s) used to introduce the first reactant of a mixture of uranium hexafluoride and an oxygen-containing carrier gas can be as long as the tube receiving the shield gas or the tube(s) used to introduce the first reactant mixture can be shorter than the tube receiving the shield gas by a distance varying from about ⅛ to about ½ an inch.

The flame conversion of uranium hexafluoride avoids the build-up of reaction products, largely solid uranium oxides, at the tips of the tubes carrying the uranium hexafluoride-carrier gas mixture and the shield gas due to the fact that the conversion flame is maintained away from the tips of these tubes. The shield gas temporarily shields the reactive uranium hexafluoride-carrier gas mixture from contact with the reducing gas until the mixture has moved away from the end of the tubes through which gases are introduced into the reaction zone. After cross diffusion of the gaseous reactants through the shield gas, a reaction results between the uranium hexafluoride, the carrier gas and the reducing atmosphere in the reaction zone. The reaction zone is preferably heated initially to a temperature of at least about 100° C. before the conversion reaction is started so there will be no condensation of water vapor on the walls of the reactor which would tend to result in agglomeration of the uranium dioxide particles on the walls of the reactor.

The velocity of the gaseous mixture of uranium hexafluoride and the oxygen-containing carrier gas is important in the practice of this step of the invention, and the rate of flow of this mixture should exceed the rate of flame propagation so that the flame is maintained away from this tube. The distance the flame is removed from the tube introducing the uranium hexafluoride-carrier gas mixture is critical to the shape of the flame. If the distance is too great there tends to be incomplete conversion of the uranium hexafluoride to oxide, and if the distance is too small the flame tends to burn too close to the tube, eventually leading to a build-up of reaction products and plugging of the tube.

This conversion step of the present invention is based on the following apparent overall reduction-hydrolysis reaction:

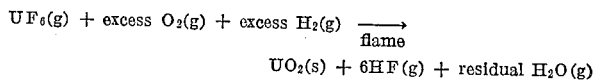

$$UF_6(g) + \text{excess } O_2(g) + \text{excess } H_2(g) \xrightarrow{\text{flame}} UO_2(s) + 6HF(g) + \text{residual } H_2O(g)$$

Any of the preferred practices for starting the process disclosed in the aforementioned U.S. patent application Ser. No. 77,446 can be used in the practice of this step of the invention.

The reactor used in this step of the process can be any of the reactors disclosed in the aforementioned U.S. patent application Ser. No. 77,446.

Separation of $UO_2$ Rich Powder from Gas Stream

The powder which is formed in the reactor is very fine and settles from the gas phase toward the bottom of reactor 18 where the powder is withdrawn from the reactor in line 19 to a chamber 40 holding a series of Monel® filters 31 which are periodically back pulsed. These filters catch the uranium dioxide while leaving the gas stream free to exit from chamber 40 into line 20.

Condensation of Hydrogen Fluoride and Water Vapor as Hydrofluoric Acid

Before discussing the processing of the uranium dioxide rich powder, one typical treatment of the gas stream withdrawn from reactor 18 will be described. The gas stream is withdrawn from the reactor 18 by the vacuum maintained by vacuum pump 26 and passes through chamber 40 and porous Monel filters 31 into line 20 to condenser 21 which is maintained at a temperature in the range of about 33° to about 70° F. At this point a substantial portion of the hydrogen fluoride and water vapor is condensed in Teflon® lined condenser 21 and collected in acid tank 23 made of or lined with Teflon. The remainder of the gas stream leaving tank 23 passes through a liquid nitrogen cold trap 24 serving to condense and collect hydrogen fluoride and moisture traces in the gas stream. The gas stream then enters drying bed 25 for further removal of traces of hydrogen fluoride and water vapor before passing through vacuum pump 26 to gas scrubber 27. Scrubber 27 is used to remove any residual traces of gases in the gas stream other than hydrogen after which the hydrogen is burned in burner 28 which is open to the atmosphere. A flame arrester 41 is utilized to assure no strike back of the flame.

Acid tank 23 collects a grade of aqueous hydrofluoric acid which is commercially acceptable with about 30 to about 80%, preferably about 50 to about 75%, hydrogen fluoride by weight and less than about 300 parts per million impurities with oxides and fluorides of uranium constituting a substantial proportion of these impurities. Usually more than 95% of the fluoride is so recovered. This is one of the advantages of the practice of the present invention and is a result of the efficient, complete conversion of uranium hexafluoride to uranium dioxide in the reactor so that a minimum of uranium impurity is present in the gas stream drawn off the reactor.

Defluorination of $UO_2$ Rich Powder

The uranium dioxide rich powder produced in the reactor 18 will contain a low fluoride concentration varying up to about 50,000 parts per million depending on the parameters selected for the flame conversion. Fluoride impurities in uranium dioxide compositions are undesirable as these impurities interfere with full development of the potential nuclear properties of the uranium dioxide.

Where the flame conversion of uranium hexafluoride has been conducted with processing parameters yielding a low fluoride content in the uranium dioxide powder, e.g., less than about 5,000 parts per million, this low fluoride uranium dioxide can be prepressed, granulated, pressed and sintered directly with good results if the sintering is conducted in a defluorinating atmosphere. This amounts to an omission of the optional defluorination step shown in FIG. 1. The ceramic structure produced from the sintered powder which is not defluorinated will yield an acceptable product of minimum fluoride content. However, the furnace used for sintering this uranium dioxide with fluoride impurities must be constructed of materials resistant to corrosion by hydrogen fluoride.

Where the uranium dioxide has a fluoride content of greater than 5,000 parts per million, a separate defluorination step is preferably used so that the subsequent sintering process will not have to achieve appreciable removal of fluoride from the compacted ceramic structure. This defluorination step will also enable utilization of conventional sintering furnaces since there will be no appreciable hydrogen fluoride corrosion of the conventional materials.

Referring again to FIG. 2, the defluorination step utilized in the practice of this invention is conducted on powder withdrawn from chamber 40 and placed in furnace 39. The furnace is designed to have excellent gas-solids contact such as a rotary kiln type of furnace which circulates the powder so that the diffusion aspect of the defluorination step is minimized. The atmosphere of the furnace is controlled so as to be non-oxidizing, and can be either (1) a reducing gas containing water vapor such as wet hydrogen or wet dissociated ammonia, or (2) an alcohol vapor with or without a carrier gas as disclosed in copending U.S. patent application Ser. No. 55,744 filed July 17, 1970, now U.S. Pat. No. 3,755,188, issued Aug. 28, 1973, in the names of L. N. Grossman and D. A. Brigham and assigned to the assignee of this invention, or (3) a mixture of about 2 to about 95 percent hydrogen by volume with the balance being carbon dioxide as disclosed in copending U.S. patent application Ser. No. 62,308 filed Aug. 10, 1970 in the name of Yogesh Nivas and assigned to the assignee of this invention.

This defluorination step achieves the removal of fluoride ions from the uranium dioxide rich powder to a concentration of about 300 parts per million or less.

Where alcohol vapor, with or without a carrier gas, or a mixture of carbon dioxide and hydrogen constitute the defluorinating atmosphere, it has been found that the defluorinated powder has the initial surface area of the powder preserved throughout the defluorination process. When the defluorinating atmosphere is a mixture of carbon dioxide and hydrogen within the foregoing range, the defluorinated powder has a controlled stoichiometric oxygen to uranium ratio within the range of $2.1:1 \pm .07:1$.

As applied to the process of this invention where an alcohol vapor containing atmosphere is selected as the defluorinating atmosphere, the step is carried out under a controlled atmosphere having the essential dehalogenating component of a vaporized alcohol. The alcohol employed can include one or more aliphatic alcohols of the general formula $C_nH_{2n}HOH$ where $n$ is an integer from 1 to 10. The alcohol-containing atmospheres can also include additional gaseous components either (1) serving as a carrier for the alcohol with the carrier being non-reactive with the composition being dehalogenated such as air, oxygen, nitrogen, helium, neon, argon, krypton, xenon and mixtures of the foregoing, or (2) serving as an active dehalogenation carrier such as dry hydrogen, wet hydrogen, dissociated ammonia and mixtures of the foregoing. The temperature of this defluorinating step is generally between about 600° F. and about 1600° F. and preferably between about 600° F. and about 1100° F. where it is desired to have a powder of high surface area. Where the atmosphere used for defluorination contains only vaporized alcohol, a higher temperature up to about 1600° F. can be utilized with a particularly preferred range of temperature being about 1200 to about 1600° F. Where it is important to preserve the surface area of the powder being defluorinated, a preliminary drying step involving heating under a dry, inert atmosphere (e.g., nitrogen, helium, neon, argon, air, oxygen and mixtures thereof) at a temperature in the range of about 200 to about 750° F. is practiced.

Where an atmosphere of a mixture of carbon dioxide and hydrogen is selected as the defluorinating atmosphere, the step is carried out at a temperature in the range of about 750 to about 1470° F. under a controlled atmosphere having the essential dehalogenating components of carbon dioxide and hydrogen. The atmosphere controls the partial pressure of oxygen over the particulate composition during heating and removes excess oxygen giving a controlled oxygen-to-metal ratio for the treated composition. An atmosphere in the range of about 2 to about 95 percent hydrogen by volume with the balance being carbon dioxide can be employed and a preferred range is about 20 to about 80 percent hydrogen by volume with the balance being carbon dioxide. The carbon dioxide and hydrogen react to give water vapor and carbon monoxide in the foregoing temperature range. The water vapor acts as a hydrolysis agent for removing fluoride ions from the composition being defluorinated.

After being defluorinated to a fluoride ion content of less than about 300 parts per million by weight, the uranium dioxide exists in powder form with a particle size of less than 1 micron, and is ready for immediate fabrication into structures such as pellets of various shapes adapted for commercial utilization without further comminution techniques. Further, the uranium dioxide powder has a surface area of about 4 to about 6 square meters per gram and is a light, fluffy powder with low flow characteristics.

Prepressing, Granulating and Addition of Lubricant to $UO_2$ Powder

In order to increase the flow and bulk density properties of the defluorinated uranium dioxide powder, the powder is prepressed and granulated in any of a variety of processes. The prepressing involves application of pressures to given quantities of the powder to form green, uncured shapes in any of a wide variety of devices using forces which are at least 10% below the final forming pressures used to give compacted structures capable of being sintered. Representative shapes are cylinders, cubes, parallelepipeds, etc., of various dimensions. In the granulation step the prepressed bodies are granulated and passed through a screen of given mesh size to produce a free flowing granular powder. As an optional step, the granulated powder can have a lubricant added at this point with a representative lubricant being Sterotex®, a vegetable stearate which serves to lubricate the die at pressing time. The lubricant can be added by rolling the powder in a drum on a set of rolls. The rolling time is kept to a minimum sufficient to give a good distribution of the lubricant, in order to avoid destroying the granular structure of the powder, which breaks down by attrition when subjected to excessive rolling.

The following is representative of the preliminary processing steps of prepressing and granulation of the uranium dioxide powder before it is pressed in desired shapes for sintering. The uranium dioxide powder is prepressed in a press at pressures up to about 25,000 pounds per square inch into the aforementioned desired shapes. These desired shapes are then granulated in a granulator and screened through a screen having openings in the range of about 6 to 20 mesh. This processing sequence yields a uranium dioxide powder having improved flow and bulk density properties.

Pressing Shaped Structures

The prepressed and granulated uranium dioxide powder, with or without an added lubricant, is formed by various methods into the desired shapes for sintering. Representative of these shapes are cylinders, cubes, parallelepipeds, etc., of various dimensions. Representative forming techniques include single end pressing, double ended pressing, isostatic pressing or extrusion of the desired green shapes. In general, the forming pressure at this time is greater than the prepressing pressures but less than pressures producing laminations. Representative pressures applied to the ceramic powders to produce green shapes are in the range of about 10,000 to about 40,000 pounds per square inch. Representative dimensions of one preferred green shape of cylindrical pellets made by this invention capable of utilization as a nuclear fuel are pellets of about ½ an inch in diameter and a height of about ½ an inch weighing about 10 grams.

Controlled Atmosphere Sintering of $UO_2$

The green shapes of uranium dioxide are fired in a heated furnace under a controlled atmosphere to give sintered structures of high density and controlled grain size. The green shapes have very active uranium dioxide particles so that a variety of firing schedules may be employed in the sintering. As used herein, the term "active" means particles having high surface area which readily sinter to compact structures. In general, depending on the sintering atmosphere, the green shapes are heated to a temperature in the range of about 900 to about 1700° C. from about half an hour to about 4 hours. Preferred temperature ranges can be selected from the foregoing range to develop particular properties of the sintered ceramic. The atmosphere maintained in the furnace can be selected from either (1) a reducing gas saturated with water vapor such as wet hydrogen or wet dissociated ammonia, or (2) a mixture of about 0.5 to about 90 percent hydrogen by volume with the balance being carbon dioxide as disclosed in copending U.S. patent application Ser. No. 62,353, filed Aug. 10, 1970 in the names of W. R. De Hollander and Yogesh Nivas and assigned to the assignee of this invention.

If a small grained, high density structure is desired using a wet hydrogen or wet ammonia atmosphere, the green shapes are heated to a temperature in the range of 1650° C.±50° C. for short times of about one to about two hours, with an additional ½ hour being used to bring the furnace to this temperature range and an additional ½ hour being used to cool the furnace from this temperature range. Another alternative for sintering the green shapes is to heat the shapes to a temperature in the range of about 1050° C.±50° C. for longer periods of about 8 to about 12 hours. This firing cycle also has additional ½ hour periods each for bringing the furnace to the temperature range and cooling the furnace from this temperature range. This thermal processing gives a smaller grain, lower density structure. The atmosphere of the furnace is controlled so as to be non-oxidizing.

The powders are sintered to very high density by heating to a temperature in the range of about 900 to about 1500° C. under the atmosphere of a mixture of carbon dioxide and hydrogen in the foregoing range. This gives a sintered uranium dioxide structure having a controlled, nearly stoichiometric ratio of oxygen to metal atoms. The hydrogen and carbon dioxide react to produce water vapor and carbon monoxide with the partial pressure of oxygen of the atmosphere depending on the relative proportions of hydrogen and carbon dioxide. The partial pressure of oxygen of the atmosphere provides the control of the ratio of oxygen to metal atoms in the sintered composition. The water vapor produced from the reaction of the hydrogen and carbon dioxide acts as a hydrolysis agent for removing fluoride ions.

The following is a summary of the range of properties achieved for the sintered uranium dioxide structures:

density: about 90 to about 99 percent of theoretical
grain size: about 1 to about 8 microns
fluoride ion content: less than about 25 parts per million
gas content: less than about 10 microliters/gram The following examples are offered to show representative processes of the disclosed invention as carried out to produce uranium dioxide structures from uranium hexafluoride. The following examples are offered to be representative of the teaching of this process and in no way serve to limit the teaching of this invention.

EXAMPLE 1

A reactor 18 as shown schematically in FIG. 2 is assembled having a reactor vessel 6 inches in diameter of schedule 40 Pyrex® glass pipe 36 inches long provided with end flanges, one end of which fits a flange on a Monel plate 32 slightly over 6 inches in diameter. The Monel plate 32 has an opening receiving a larger alumina tube 29 of ¾ inch outside diameter by ½ inch inside diameter with a smaller concentric alumina tube 33 of ⅜ inch outside diameter and ¼ inch inside diameter positioned within the larger tube 29. The smaller tube 33 fits through and is sealed into an opening in the top of the larger tube 29. The smaller tube 33 is shorter than the larger tube 29 and the distance between the tip of the smaller tube 33 and the tip of the larger tube 29 in the reactor is ¼ inch. Two alumina tubes 30 of ⅜ inch outside diameter and ¼ inch inside diameter are positioned in openings in the Monel plate 32, one on each side of the two concentric alumina tubes. The bottom flange of the reactor vessel is connected to a Pyrex pipe reducer 34 which is 6 inches in length having a largest diameter of 6 inches and tapering to a smallest diameter of 1 inch at the outlet which is connected to line 19 leading to chamber 40. Chamber 40 has Monel filters 31 which withdraw solid particles from the gas stream drawn from reactor 18 while permitting the gas stream to pass in line 20 to condenser 21 and Teflon tank 23 for condensing water vapor and hydrogen fluoride gas withdrawn from reactor 18 to give a hydrofluoric acid solution which is collected in tank 23. Vacuum pump 26 pulls the uncondensed portion of the gas stream from tank 23 through cold trap 24 and scrubber 25, through pump 26 to a second scrubber 27, a flame arrestor 41 and hydrogen burner 28 followed by release of the gas to the atmosphere.

A cylinder 10 of uranium hexafluoride gas and a cylinder 12 of oxygen as the carrier gas are connected to line 11 so controlled mixtures of these gases can be metered into reactor 18 through tube 33. Before the process is started the cylinder 10 of uranium hexafluoride is heated in a water bath to a temperature in the range of 140 to 180° F. by use of an electric immersion heater. Cylinders 16 of hydrogen are connected to line 15 leading to tubes 30 and reactor 18, and a source 13 of nitrogen is connected to lines 14 feeding tube 29 which empties into the reactor 18. The nitrogen is the shield gas which functions as a temporary barrier between the reducing atmosphere of hydrogen and the oxygen-uranium hexafluoride mixture for a sufficient time so that the reaction flame forms in a region away from the tip of tube 29. Tube 29 extends approximately ¼ of an inch further into the reactor when the Monel plate 32 is connected to reactor 18 than does tube 33.

The following sequence is used to initiate the uranium hexafluoride conversion to uranium dioxide. A vacuum of 8 inches of mercury is drawn on reactor 18 by vacuum pump 26. The reactor is purged with nitrogen through tube 29 for about five minutes to achieve an oxygen free atmosphere after which the nitrogen was stopped and a reducing atmosphere is established in the reactor by flowing hydrogen through tubes 30 at the rate of 0.0682 pound moles per hour. The ignition means 17 is turned on to create a regular spark in the reactor followed by introduction of the nitrogen shield gas through tube 29. Next the carrier gas of oxygen is introduced into the reactor through line 11 and tube 33 which gives a bluish flame which begins about ½ inch from the top of tube 29. After the flame reaches equilibrium, the uranium hexafluoride flow is started into the reactor in line 11 and tube 33, initially in small quantities with a gradually increasing rate of flow up to a rate of about 0.00304 pound moles per hour. Under these conditions, the molar ratio of the oxygen to uranium hexafluoride is about 2.4. With the introduction of uranium hexafluoride, a change to a bright orange flame is noted. The reaction proceeds with the unique feature of avoiding contact of reaction products with the tip of the tubes 29 and 33. It is noted that the flame is lifted or removed from tube 29 approximately ½ inch throughout the run. This means that the formation of uranium dioxide product is taking place away from the tips of tubes 29 and 33.

The uranium dioxide rich powder and the gaseous reactor products are drawn from reactor 18 in line 19 to chamber 40 where the powder is collected by Monel filters 31, and the gaseous reaction products exit chamber 40 in line 20 to condenser 21 which is maintained at 55±10° F. Teflon tank 23 collects the hydrogen fluoride-water vapor condensed in condenser 21 with the remainder of the gaseous products passing in line 30 through a liquid nitrogen trap 24, which condenses any residual hydrogen fluoride or water vapor in the gaseous reaction products, through a drying bed 25 and vacuum pump 26 to scrubber 27 which removes residual fluoride gases. The gaseous reaction products then pass through flame arrestor 41 and burner 28 followed by being released to the air. Tank 23 collects a 70% by weight aqueous hydrofluoric acid having less than 10 parts per million impurities.

The powder collected in chamber 40 is removed and placed in furnace 39 for defluorination with a 4 hour heating cycle at 700° C. in a controlled atmosphere of wet (saturated) hydrogen. The average fluoride ion content of the uranium dioxide withdrawn from chamber 40 is 5000 parts per million, and after defluorination, the fluoride ion content of the uranium dioxide is reduced to 150 parts per million with an oxygen to uranium ratio of about 2.05. The fluoride content of the uranium dioxide powder is determined by pyrolysis.

The uranium dioxide is then prepressed at 25,000 pounds per square inch into cylindrical pellets of ½ an inch in diameter and 0.6 inch in height followed by granulation and passage through a 20 mesh screen to produce a free flowing granular powder.

The uranium dioxide granular powder is compacted into cylindrical pellets of ½ an inch in diameter by 0.6 inch in height at 30,000 pounds per square inch and then sintered at 1700° C. for four hours in a controlled atmosphere of wet hydrogen to give a sintered cylindrical structure having a density of 95.8% of theoretical density. The fluoride ion content is less than 25 parts per million, and the average grain size is about 1 micron.

EXAMPLES 2 AND 3

The process of Example 1 is repeated using the same general procedure with the variation in the parameters noted in Table 1. Table 1 reports in consecutive columns the example number, the rate of flow of uranium hexafluoride in pounds per hour to the reactor, the total time of the processing run, the composition of the reducing gas, the composition of the carrier gas, the composition of the shielding gas, the effective molar ratios of hydrogen to uranium hexafluoride and oxygen to uranium hexafluoride in the reactor during processing, the weight percentage of fluoride ion in the resulting uranium dioxide powder, the vacuum drawn on the reactor during the process, the surface area of the uranium dioxide before and after the defluorination process, and the sintered density of the uranium dioxide pellets (as a percent of theoretical density). The content of the fluoride ion in the uranium dioxide powder is determined by pyrolysis. The defluorination process and sintering process use wet hydrogen where hydrogen is bubbled through water at room temperature and passed over the powder in a furnace maintained at 750° C. for four hours.

TABLE 1.—URANIUM HEXAFLUORIDE CONVERSION

| Example | UF₆ flow, lbs./hr. | Time in minutes of process | Composition of— | | | Effective molar ratios | | Percent F in UO₂ | Reactor vacuum in inches of mercury | Surface area of UO₂ (m²/g.) | | Sintered density UO₂ Pellets as percent of theoretical density |
| | | | Reducing gas | Carrier gas | Shielding gas | $H_2/UF_6$ | $O_2/UF_6$ | | | Before defluorination | After defluorination | |
| --- | --- | --- | --- | --- | --- | --- | --- | --- | --- | --- | --- | --- |
| 2 | 1.20 | 10 | $H_2$ | $O_2$ | $N_2$ | 15.8 | 5.7 | 4.7 | 8 | 9.6 | 2.70 | 93.4 |
| 3 | 4.20 | 10 | $H_2$ | $O_2$ | $N_2$ | 6.1 | 2.2 | 6.1 | 5 | 8.0 | 1.40 | 88.7 |

EXAMPLES 4–16

The process of Example 1 is repeated using the same general procedure with the variations in the parameters noted in Table 2 and a different tube arrangement for the reactor. Six alumina tubes of 3/8 inch outside diameter and 1/4 inch inside diameter and equally spaced around a 1 1/2 inch diameter circle introduce the mixture of uranium hexafluoride and oxygen-containing carrier gas to the reaction zone. The six alumina tubes are positioned inside an alumina tube of 2 1/4 inches inside diameter and 2 1/2 inches outside diameter. The smaller tubes are shorter than the larger tube so that the smaller tubes are recessed 3/8 inch inside the larger tube. Table 2 reports in consecutive columns the example number, the rate of flow of uranium hexafluoride in pounds per hour to the reactor, the total time in minutes of the process run, the composition of the reducing gas, the composition of the carrier gas, the composition of the shielding gas, the effective molar ratios of hydrogen to uranium hexafluoride and oxygen to uranium hexafluoride in the reactor during processing, the weight percentage of fluoride ion in the resulting uranium dioxide product, the vacuum drawn on the reactor during the process, the surface area of the uranium dioxide particles before and after the defluorination process, the defluorination atmosphere used on the uranium dioxide powder, the sintered density of the uranium dioxide pellets (as a percent of theoretical density) and the atmosphere in which the pellets are sintered. The effective molar ratio of hydrogen is given for the reducing gas where the reducing gas is either hydrogen or the hydrogen portion of dissociated ammonia. The effective molar ratio of oxygen is given for all oxygen in the reactor, whether coming from the carrier gas as oxygen or air or from the shielding gas when air is used. The content of the fluoride ion in the uranium dioxide powder and pellets is determined by pyrolysis. Dashes indicate the property was not determined.

TABLE 2.—URANIUM HEXAFLUORIDE CONVERSION

| Example | UF$_6$ flow, lbs./hr. | Time in minutes of process | Composition of— | | | Effective molar ratios | | Percent F in UO$_2$ of reactor | Reactor vacuum in inches of mercury | Surface area (m.²/g.) | | Defluorination atmosphere | Sintering UO$_2$ pellets | |
|---|---|---|---|---|---|---|---|---|---|---|---|---|---|---|
| | | | Reducing gas | Carrier gas | Shielding gas | H$_2$/UF$_6$ | O$_2$/UF$_6$ | | | Before defluorination | After defluorination | | Density as percent of theoretical | Atmosphere |
| 4 | 4.0 | 15 | H$_2$ | O$_2$ | N$_2$ | 10.6 | 3.6 | 2.2 | 6 | 7.50 | 2.90 | Wet H$_2$ | 96.1 | Wet H$_2$. |
| 5 | 3.4 | 23 | H$_2$ | O$_2$ | N$_2$ | 8.0 | 2.7 | 4.8 | 8 | 8.70 | 0.88 | do | 69.6 | Do. |
| 6 | 6.7 | 5 | H$_2$ | O$_2$ | N$_2$ | 8.2 | 2.3 | 4.1 | 15 | 6.80 | ----- | do | 97.3 | Do. |
| 7 | 3.3 | 15 | H$_2$ | O$_2$ | Air | 17.8 | 5.3 | 4.0 | 15 | 8.00 | ----- | do | ----- | Do. |
| 8 | 10.0 | 16 | H$_2$ | Air | Air | 6.9 | 2.1 | 4.0 | 10 | 8.00 | 1.60 | Methanol plus H$_2$ | 98.7 | Do. |
| 9 | 5.2 | 21 | H$_2$ | Air | Air | 11.3 | 3.0 | 4.0 | 12 | 9.49 | 8.00 | do | 98.6 | Do. |
| 10 | 14.5 | 6 | H$_2$ | Air | Air | 4.7 | 1.4 | 9.0 | 10 | 5.60 | 5.50 | do | 96.5 | Do. |
| 11 | 14.0 | 15 | NH$_3$ | Air | Air | 4.9 | 1.5 | 3.3 | 8 | 5.88 | 8.60 | do | 96.7 | Do. |
| 12 | 5.6 | 10 | NH$_3$ | Air | Air | 10.0 | 3.5 | 3.9 | 10 | 6.80 | 6.43 | do | 99.1 | Do. |
| 13 | 8.9 | 15 | H$_2$ | Air | Air | 7.0 | 2.6 | 5.2 | 10 | 8.97 | 7.85 | do | 97.4 | Do. |
| 14 | 3.7 | 25 | H$_2$ | O$_2$ | Air | 18.0 | 8.0 | 2.6 | 18 | 10.30 | 10.20 | H$_2$ plus CO$_2$ | 98.9 | H$_2$ plus CO$_2$. |
| 15 | 2.7 | 10 | H$_2$ | Air | Air | 17.1 | 0.2 | 0.2 | 15 | 9.45 | 8.95 | do | 98.7 | Do. |
| 16 | 9.7 | 30 | NH$_3$ | Air | Air | 5.7 | 2.2 | 6.1 | 6 | 5.60 | 4.23 | do | 94.8 | Do. |

As will be apparent to those skilled in the art, various modifications and change may be made in the method described herein. It is accordingly the intention that the invention be construed in the broadest manner within the spirit and scope as set forth in the accompanying claims.

What is claimed is:

1. The process of fabricating ceramic structures of uranium dioxide from gaseous uranium hexafluoride having the steps of:

(a) preparing a uranium dioxide rich powder from gaseous uranium hexafluoride in the presence of an active flame in a reactor defining a reaction zone by (i) introducing a first gaseous reactant comprising a mixture of uranium hexafluoride and an oxygen-containing carrier gas into the reaction zone, (ii) separately introducing a second gaseous reactant comprising a reducing gas into the reaction zone, and (iii) separately introducing a shielding gas into the reaction zone between the first gaseous reactant and the second gaseous reactant to prevent temporarily substantial mixing and reaction between the first gaseous reactant and the second gaseous reactant until sufficient cross diffusion of the reactants occurs as the reactants pass through the reaction zone resulting in a reaction between the reactants producing a uranium dioxide rich powder and gaseous reaction products;

(b) separating the uranium dioxide rich powder from the gaseous reaction products produced in the reaction zone;

(c) prepressing the uranium dioxide rich powder to a structure of desired shape and dimensions;

(d) granulating the structure of step (c) to produce a free flowing granular powder;

(e) pressing the uranium dioxide rich powder of step (d) to a structure of desired shape and dimensions; and (f) sintering the structure of step (e) in a controlled atmosphere to give a uranium dioxide structure of controlled density and grain size.

2. The process of claim 1 in combination with the step of subjecting the uranium dioxide rich powder separated from the gaseous reaction products in step (b) to a preliminary defluorinating step comprising heating the powder in a controlled atmosphere.

3. The process of claim 2 in which the controlled atmosphere in the defluorinating step is comprised of wet hydrogen.

4. The process of claim 2 in which the controlled atmosphere in the defluorinating step is comprised of vaporized alcohol.

5. The process of claim 2 in which the controlled atmosphere in the defluorinating step is comprised of vaporized alcohol with a carrier gas.

6. The process of claim 2 in which the controlled atmosphere in the defluorinating step is comprised of a mixture of carbon dioxide and hydrogen.

7. The process of claim 2 in which the controlled atmosphere in the defluorinating step is comprised of wet dissociated ammonia.

8. The process of claim 1 in combination with the step of treating the gas stream separated from the uranium dioxide rich powder in step (b) to recover the hydrogen fluoride constituent as aqueous hydrofluoric acid.

9. The process of claim 1 in which a lubricant is added to the uranium dioxide after the granulating step.

10. The process of claim 1 in which the sintering atmosphere is comprised of wet hydrogen.

11. The process of claim 1 in which the sintering atmosphere is comprised of a mixture of carbon dioxide and hydrogen.

12. The process of fabricating ceramic structures of uranium dioxide from gaseous uranium hexafluoride having the steps of:
(a) preparing a uranium dioxide rich powder from the gaseous uranium hexafluoride in the prsence of an active flame in a reactor defining a reaction zone by:
(i) introducing a first gaseous reactant comprising a mixture of uranium hexafluoride and an oxygen-containing carrier gas into the reaction zone.
(ii) separately introducing a second gaseous reactant comprising a reducing gas into the reaction zone, and
(iii) separately introducing a shelding gas into the reaction zone between the first gaseous reactant and the second gaseous reactant to prevent temporarily substantial mixing and reaction between the first gaseous reactant and the second gaseous reactant until sufficient cross diffusion of the reactants occurs as the reactants pass through the reaction zone resulting in a reaction between the reactants producing a uranium dioxide rich powder and gaseous reaction products;
(b) separating the uranium dioxide rich powder from the gaseous reaction products produced in the reaction zone;
(c) defluorinating the uranium dioxide rich powder in in a controlled atmosphere;
(d) prepressing the uranium dioxide rich powder to a structure of desired shape and dimensions;
(e) granulating the structure of step (d) to produce a free flowing granular powder;
(f) pressing the uranium dioxide rich powder to a structure of desired shape and dimensions; and
(g) sintering the structure of step (f) in a controlled defluorinating and reducing atmosphere to give a uranium dioxide structure of controlled density and grain size.

13. The process of claim 12 in which the controlled atmosphere in the defluorinating step is comprised of wet hydrogen.

14. The process of claim 12 in which the controlled atmosphere in the defluorinating step is comprised of vaporized alcohol.

15. The process of claim 12 in which the controlled atmosphere in the defluorinating step is comprised of vaporized alcohol with a carrier gas.

16. The process of claim 12 in which the controlled atmosphere in the defluorinating step is comprised of a mixture of carbon dioxide and hydrogen.

17. The process of claim 12 in which the controlled atmosphere in the defluorinating step is comprised of wet dissociated ammonia.

18. The process of claim 12 in which the sintering atmosphere is comprised of wet hydrogen.

19. The process of claim 12 in which the sintering atmosphere is comprised of a mixture of carbon dioxide and hydrogen.

20. The process of claim 12 in which a lubricant is added to the uranium dioxide after the granulating step.

References Cited
UNITED STATES PATENTS

| | | | |
|---|---|---|---|
| 3,365,274 | 1/1968 | Carpenter et al. | 23—202 |
| 3,382,042 | 5/1968 | Richardson et al. | 23—202 |
| 3,504,058 | 3/1970 | Masselot | 264—0.5 |
| 3,564,081 | 2/1971 | Francois et al. | 264—0.5 |
| 3,375,306 | 3/1968 | Russell | 264—0.5 |
| 3,000,703 | 9/1961 | Brugger | 23—140 |
| 3,260,575 | 7/1966 | Heestand | 23—355 |
| 3,051,566 | 8/1962 | Schwartz | 264—0.5 X |
| 3,168,369 | 2/1965 | Reese et al. | 23—355 |
| 3,179,491 | 4/1965 | Ukaji et al. | 23—355 |

FOREIGN PATENTS

41/10,095  5/1966  Japan.

BENJAMIN R. PADGETT, Primary Examiner

R. L. TATE, Assistant Examiner

U.S. Cl. X.R.

252—301.1 R; 423—261

UNITED STATES PATENT OFFICE
CERTIFICATE OF CORRECTION

Patent No. 3,786,120     Dated 15 January 1974

Inventor(s) W. R. DeHollander et al

It is certified that error appears in the above-identified patent and that said Letters Patent are hereby corrected as shown below:

Column 1, line 19, "usrface" should be --surface--. Column 10, in the last heading of Table 1, "Pullets" should be --Pellets-- and " OJ" should be --of--. Claim 4, line 2, the second occurrence of "in" should be --is--. Claim 12, line 5, "prsence" should be --presence--; and line 9, the period after "zone" should be a comma.

Signed and sealed this 10th day of December 1974.

(SEAL)
Attest:

McCOY M. GIBSON JR.                C. MARSHALL DANN
Attesting Officer                  Commissioner of Patents